(12) United States Patent
Fan et al.

(10) Patent No.: US 6,723,462 B2
(45) Date of Patent: Apr. 20, 2004

(54) LOW COST METAL BIPOLAR PLATES AND CURRENT COLLECTORS FOR POLYMER ELECTROLYTE MEMBRANE FUEL CELLS

(75) Inventors: Qinbai Fan, Chicago, IL (US); Jeremy R. Chervinko, Elk Grove, IL (US); Michael Onischak, St. Charles, IL (US); Leonard G. Marianowski, Mount Prospect, IL (US)

(73) Assignee: Gas Technology Institute, Des Plaines, IL (US)

( * ) Notice: Subject to any disclaimer, the term of this patent is extended or adjusted under 35 U.S.C. 154(b) by 196 days.

(21) Appl. No.: 09/827,677

(22) Filed: Apr. 6, 2001

(65) Prior Publication Data

US 2002/0172849 A1 Nov. 21, 2002

(51) Int. Cl.⁷ .................................. H01M 2/16
(52) U.S. Cl. ............................ 429/34; 429/38
(58) Field of Search ............................ 429/34, 35, 37, 429/38, 39

(56) References Cited

U.S. PATENT DOCUMENTS

| | | | |
|---|---|---|---|
| 5,733,678 A | * | 3/1998 | Ledjeff et al. ............... 429/30 |
| 5,942,347 A | | 8/1999 | Koncar et al. |
| 6,007,932 A | * | 12/1999 | Steyn ........................... 429/31 |
| 6,099,984 A | * | 8/2000 | Rock ............................ 429/39 |
| 6,300,001 B1 | | 10/2001 | Hornung et al. |
| 6,372,374 B1 | * | 4/2002 | Li et al. ....................... 429/36 |

* cited by examiner

*Primary Examiner*—Randy Gulakowski
*Assistant Examiner*—M. Wills
(74) *Attorney, Agent, or Firm*—Mark E. Fejer

(57) ABSTRACT

A polymer electrolyte membrane fuel cell stack having a plurality of substantially planar fuel cell units, each of which comprises an anode electrode, a cathode electrode and a polymer electrolyte membrane disposed between the anode electrode and the cathode electrode. A metal bipolar plate is disposed between the anode electrode of one fuel cell unit and the cathode electrode of an adjacent fuel cell unit. The metal bipolar plate is made of a chromium-nickel austenitic alloy, in which the chromium and the nickel, on a combined basis, make up at least about 50% by weight of the alloy.

15 Claims, 2 Drawing Sheets

LOW COST METAL BIPOLAR PLATES AND CURRENT COLLECTORS FOR POLYMER ELECTROLYTE MEMBRANE FUEL CELLS

BACKGROUND OF THE INVENTION

1. Field of the Invention

This invention relates to polymer electrolyte membrane fuel cells, polymer electrolyte membrane fuel cell stacks, and, in particular, low cost metal bipolar plates and current collectors for polymer electrolyte membrane fuel cells and fuel cell stacks.

2. Description of Prior Art

A polymer electrolyte membrane fuel cell is an electrochemical device capable of producing electricity (and chemical compounds), which is a promising option as a power source for electrical vehicles. Polymer electrolyte membrane fuel cells comprise an anode electrode, a cathode electrode and a polymer electrolyte membrane disposed therebetween. To provide sufficient electrical output, individual fuel cell units are stacked, one on top of the other, with electrically conductive bipolar plates disposed between the anode electrode of one fuel cell unit and the cathode electrode of an adjacent fuel cell unit.

Substantial drawbacks to widespread acceptance and implementation of polymer electrolyte membrane fuel cell systems as a power source for transportation applications are the high costs and the low power density of the fuel cell systems. A significant contributor to these drawbacks is the bipolar plate which electrically connects adjacent fuel cell units in the fuel cell stack and which provides the fuel and oxidant supply to the fuel cell units comprising the fuel cell stack. Currently, graphite is the most commonly used material for producing bipolar plates (See, for example, U.S. Pat. No. 5,942,347). On the positive side, graphite is resistant to corrosion, has low bulk resistivity and low specific density, and provides low contact resistance with the electrodes. On the negative side, graphite is high in cost, difficult to machine and brittle, the latter problem requiring that the bipolar plates have a thickness on the order of several millimeters, making the fuel cell stack both heavy and voluminous.

To be acceptable in the polymer electrolyte membrane fuel cell environment, a material for producing bipolar plates must provide high electronic conductivity, low corrosion, zero gas diffusivity, good chemical compatibility with other components of the fuel cell, low cost, low weight, low volume, sufficient strength, suitability for thermal control and suitability for fabrication. Metal plates have been proposed as an alternative to graphite plates. However, as a general rule, metal plates have a high corrosion rate in the polymer electrolyte membrane fuel cell environment, resulting in the migration of corrosion products (multivalent metal cations) to membrane sites and a reduction in proton transfer rate. In addition, metal plates are subject to the formation of insulating (high resistance) passivating layers. Noble metals are viable candidates but are very expensive. Stainless steel is a potential candidate in that it is low in cost, easy to shape and can be used in sheets as thin as 0.1 to 1.0 mm, thereby providing a low volume stack. However, stainless steel is chemically unstable in the fuel cell environment. It has a high corrosion current when in contact with the acidic electrolytic membrane in the operation region of the fuel cell and it cannot work if the pH is less than 5. To circumvent these problems, a protective coating may be applied to the stainless steel plate. However, this requires an extra processing step and adds both cost and weight to the plate and, thus, the fuel cell stack.

SUMMARY OF THE INVENTION

It is, therefore, one object of this invention to provide a low cost metal bipolar plate for polymer electrolyte membrane fuel cell stacks.

It is another object of this invention to provide a metal bipolar plate for polymer electrolyte membrane fuel cell stacks which is chemically stable in the polymer electrolyte membrane fuel cell environment and which does not require application of a protective coating.

It is another object of this invention to provide a metal bipolar plate for polymer electrolyte membrane fuel cell stacks which has good chemical compatibility with other components of the fuel cell stack.

It is still a further object of this invention to provide a metal bipolar plate for a polymer electrolyte membrane fuel cell stack which has high electronic conductivity. By "high electronic conductivity," we mean greater than about $7.5 \times 10^3$ s/cm.

These and other objects of this invention are addressed by a polymer electrolyte membrane fuel cell stack comprising a plurality of substantially planar fuel cell units, each of which comprises an anode electrode, a cathode electrode and a polymer electrolyte membrane disposed therebetween. A metal bipolar plate is disposed between the anode electrode of one fuel cell unit and the cathode electrode of an adjacent fuel cell unit. The bipolar plate comprises a chromium-nickel austenitic alloy, wherein the chromium and nickel, on a combined basis, comprises at least 50% by weight of the alloy. In accordance with a particularly preferred embodiment, the percentage by weight of nickel in the alloy is greater than the percentage of chromium.

BRIEF DESCRIPTION OF THE DRAWINGS

These and other objects and features of this invention will be better understood from the following detailed description taken in conjunction with the drawings wherein.

DETAILED DESCRIPTION OF THE PRESENTLY PREFERRED EMBODIMENTS

Figure 1:
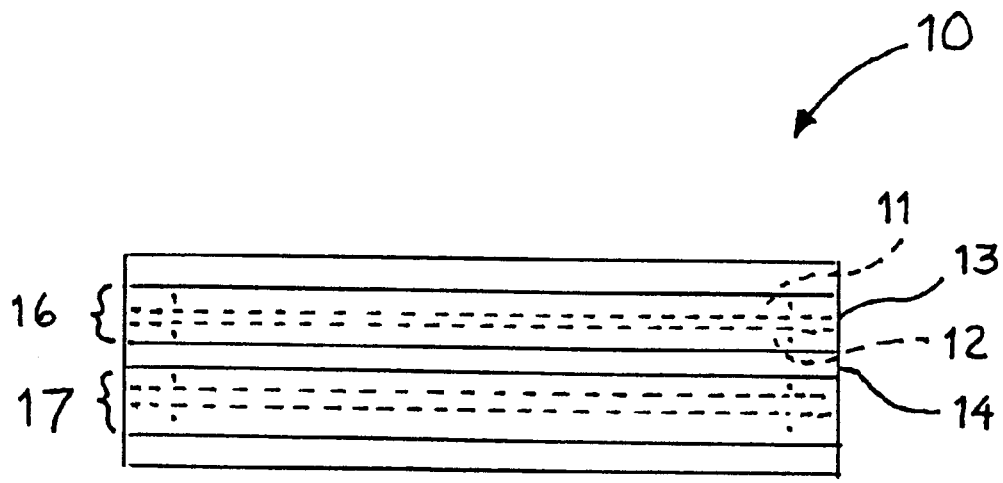
FIG. 1 is a lateral view of a portion of a polymer electrolyte membrane fuel cell stack in accordance with one embodiment of this invention.

As shown in FIG. 1, a polymer electrolyte membrane fuel cell stack 10 in accordance with one embodiment of this invention comprises a plurality of polymer electrolyte membrane fuel cell units 16, 17 comprising anode electrode 11, cathode electrode 12 and polymer electrolyte membrane 13 disposed between anode electrode 11 and cathode electrode 12. Frequently, the anode electrode, polymer electrolyte membrane and cathode electrode are formed as a single component referred to as a membrane electrode assembly or MEA. Disposed between cathode electrode 12 of one fuel cell unit 16 and anode electrode 11 of an adjacent fuel cell unit 17 is bipolar separator plate 14. In accordance with one embodiment of this invention, bipolar separator plate 14 comprises a chromium-nickel austenitic metal alloy in which the amount of chromium and nickel on a combined basis is greater than about 50% by weight of the alloy.

In operation, a fuel is introduced into the anode side of the polymer electrolyte membrane fuel cell for contact with the anode electrode and an oxidant is introduced into the cathode side of the polymer electrolyte membrane fuel cell for contact with the cathode electrode. The anode side of the polymer electrolyte membrane comprises an acidic reducing environment whereas the cathode side of the polymer electrolyte membrane comprises an oxidizing environment. In the acidic reducing environment of the anode side of the electrolyte, conventional bipolar plates made of stainless steel are chemically unstable, especially when in direct contact with the acidic electrolytic membrane. In the acid reducing environment, dissolution of chromium and other metal ions occurs, causing corrosion of the stainless steel bipolar plate. We have found that by increasing the amount of nickel in the stainless steel bipolar plate, the amount of Cr corrosion is reduced. More particularly, in accordance with one preferred embodiment of this invention, the bipolar plate is constructed from a chromium-nickel austenitic alloy in which the combination of chromium and nickel comprises greater than or equal to about 50% by weight of the alloy. In accordance with a particularly preferred embodiment, the amount of nickel present in the alloy is greater than the amount of chromium, preferably greater than about 32% by weight of the alloy, and preferably in the range of about 32% to about 38% by weight of the alloy. In addition to chromium and nickel, the austenitic alloy of the bipolar plate comprises lesser amounts of materials selected from the group consisting of C, Mn, Si, P, S, Mo, Nb, Cu and mixtures thereof Because the austenitic alloy is corrosion resistant in the acid reducing environment, even when in contact with the polymer electrolyte membrane, as may occur when the membrane extends beyond the active area as a self-gasketing membrane-electrode assembly, no protective coating of the bipolar plate is required.

Figure 2:
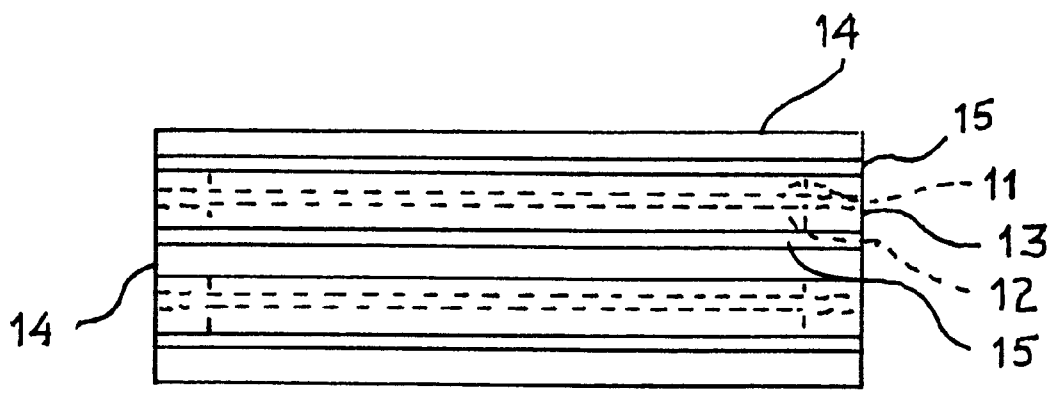
FIG. 2 is a lateral view of a portion of a polymer electrolyte membrane fuel cell stack in accordance with one embodiment of this invention.

In accordance with one preferred embodiment of this invention, the polymer electrolyte membrane fuel cell stack, as shown in FIG. 2, further comprises current collectors 15 disposed between bipolar plate 14 and anode and cathode electrodes 11 and 12, respectively, of each fuel cell unit. Due to the corrosion-resistant properties of the austenitic alloy utilized in the bipolar plate as discussed hereinabove, the austenitic alloy may also be used in the current collectors, thereby eliminating the need for protective coating of the current collectors. In this case, the bipolar plate may be made of graphite.

To verify the benefits of using a chromium-nickel austenitic alloy as previously discussed, a detailed study of corrosion resistance was carried out in which the austenitic alloy was compared to a low carbon stainless steel, 316L, considered by many to be one of the best alloys for polymer electrolyte membrane fuel cell applications. Two main experimental measurements are key to the successful operation of metal separator plates in polymer electrolyte membrane fuel cells, the corrosion current for dissolution of metal and possible passivation of the surface, and the pitting or localized corrosion when the fuel cell is on open circuit standby. Using electrochemical techniques to measure these two corrosion potentials, a comprehensive investigation of these two key measurements was performed.

A test cell comprising a metal specimen holder with the sample as a working electrode was constructed. The area of the working electrode was 1 cm$^2$. The counter electrode was comprised of two graphite rods. The reference electrode contacted the solution by means of a tube as a Luggin-Haber capillary salt bridge, a compartment filled with saturated KCl solution which provides optimum positioning of the reference electrode. The test solution used in the corrosion tests was the condensed exhaust water from an operating fuel cell having a pH of 5.5 adjusted to a pH of about 4.0 by adding $H_2SO_4$. The whole system was purged of air and kept in a water bath at 60° C. A freshly cut and sized specimen and freshly prepared solution were used for each experiment to eliminate contamination. A total of twenty-four samples were tested.

Corrosion test results were obtained using three techniques or methods -Tafel plot techniques for corrosion rates at interfacial equilibrium, cyclic polarization techniques for pitting corrosion and corrosion current under different polarizations, and a potentiostatic method for corrosion versus time.

Tafel Plot to Measure Corrosion Rate Under Wet NAFION Membrane Conditions

This technique is used to measure the corrosion current density ($I_{corr}$) so that the corrosion rate can be calculated. A Tafel plot is obtained that yields $I_{corr}$ directly or it can yield the Tafel slope constants that can be used with the polarization resistance, $R_p$, to calculate $I_{corr}$. This $I_{corr}$ value is obtained at the interfacial equilibrium between the metal and the solution, that is at the $E_{corr}$ potential.

By imposing a voltage across the electrodes in the test rig and scanning over a range of voltages, at $E_{corr}$ from −250 mV (for a cathodic Tafel plot) or +250 mV (for an anodic Tafel plot), a Tafel plot can be generated. It is possible to obtain both Tafel plots in a single scan experiment by beginning the scan at −250 mV and scanning continuously to +250 mV. There is, however, a danger in this approach that the negative portion of the scan will alter the surface of the specimen and, thus, change its characteristics during the positive portion of the scan. Therefore, freshly cut specimens were used for each region.

The scan rate typically used is 0.1 mV/sec; however, due to instrument limitations, an acceptable 1.0 mV/sec scan was employed. The resulting data are plotted as the applied potential vs. the logarithm of the measured current. Under ideal conditions, the Tafel plot is linear over some range of potentials. For a negative scan, this occurs between −50 and −250 mV vs. $E_{corr}$. For a positive scan, this occurs between +50 and 250 mV vs. $E_{corr}$. If "best fit" straight lines of the positive and negative scans are extrapolated to their intersection, the value at that intersection yields the corrosion current, $I_{corr}$, and the corrosion potential, $E_{corr}$. When 316 SS and the alloy were measured and extrapolated in this manner, the corrosion current values were nearly identical and very small.

The small corrosion current at the interfacial equilibrium is related to differences in the interfacial properties between the samples and the NAFION membrane. As is known, NAFION is an acidic ionic proton exchange membrane. Although NAFION has a high proton concentration equivalent to 1.8M $H_2SO_4$, the protons cannot easily be exchanged without current passing through the membrane. However, under fuel cell operating conditions, these values change differently.

Cyclic Polarization Curve

The Tafel plot technique can only measure corrosion rates at the interfacial equilibrium. However, in a real polymer electrolyte membrane fuel cell under operating conditions, the bipolar plates are polarized under different potentials. The corrosion current at the polarization potential can be measured by the cyclic polarization method. The cyclic polarization method measures not only the pitting tendencies of a specimen in a given metal-solution system when the fuel cell is on standby, at open circuit, but also the corrosion current under different polarizations.

In this experiment, a potential beginning at $E_{corr}$ scans positively (anodic direction) until a large increase in current occurs. The current is the corrosion current corresponding to the scan potential. When the scan reaches a programmed current density value, it reverses and begins scanning in the negative (cathodic) direction. The final potential of the scan should be negative with respect to the protection (or re-passivation) potential, (Epro). The resulting values are again plotted as the applied potential vs. logarithm of the measured current.

The potential at which the current sharply increases is defined as the pitting potential ($E_{pit}$). When pitting occurs on the forward scan, the reverse scan will typically trace a hysteresis loop. The potential where the loop closes on the reverse scan is the protection (or re-passivation) potential ($E_{pro}$). If the loop does not close, $E_{pro}$ can be estimated by extrapolating the reverse scan to zero current. If the pitting potential and the protection potential are the same, there will be little tendency to pit. If the protection potential is more positive (anodic) than the pitting potential, there will be no tendency to pit. If the protection potential is more negative than the pitting potential, pitting could occur. Generally, the reverse scan is at a higher current level than the forward scan. The size of the pitting loop seen in the plot is a rough indication of the magnitude of the pitting tendency, i.e., the larger the loop, the greater the tendency to pit.

Figure 3:
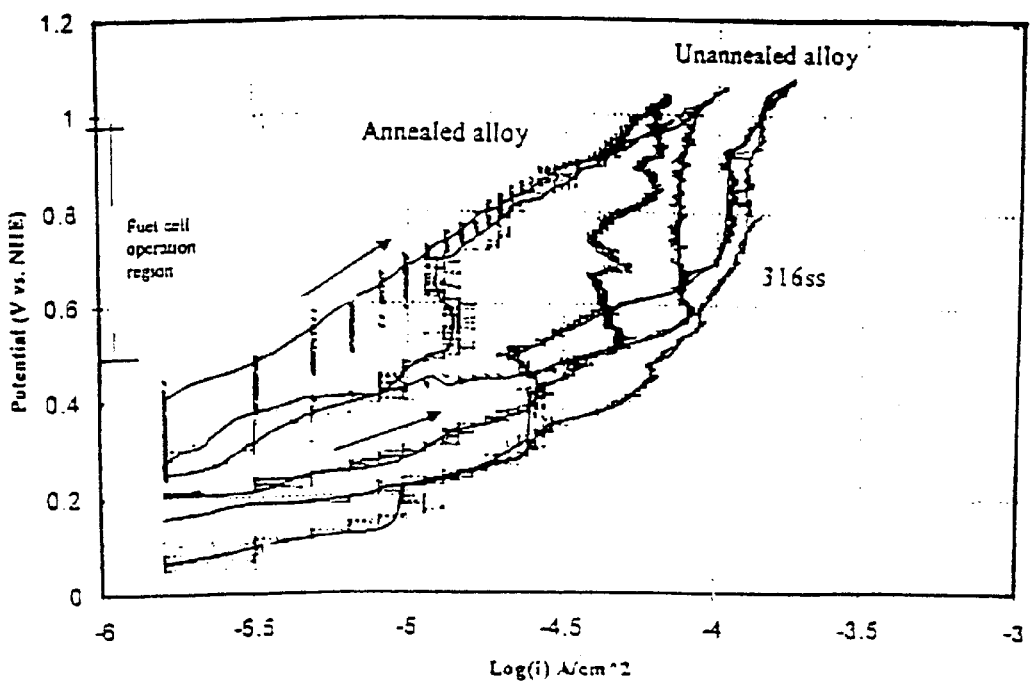
FIG. 3 is a diagram showing the cyclic polarization of 316 stainless steel and the metal alloy employed in the polymer electrolyte membrane fuel cell stack of this invention in contact with NAFION® as a half cell.

The cyclic polarization of 316 SS and an alloy suitable for use in the polymer electrolyte membrane fuel cell stack of this invention contacting at NAFION at pH of 4 is displayed in FIG. 3. The positive scan direction in FIG. 3 shows that the corrosion current of alloys suitable for use in this invention (either annealed or unannealed) has a much lower corrosion current ranging from about 1 to 32 $\mu$A at the potential range of about 0.1 to about 0.9 V vs. NHE. In contrast thereto, the 316 SS has a corrosion current ranging from about 1 to about 100 $\mu$A. In the voltage potential range of 0.5 to 0.9 V vs. NHE where the fuel cell mainly operates, the corrosion current for 316 SS is more than 30 $\mu$A. A post experimental analysis also found that the NAFION membrane changed color from transparent to a rust-type color. Table 1 hereinbelow summarizes the corrosion current of 316 SS and an exemplary alloy suitable for use in this invention, with and without contacting the NAFION membrane in an $H_2SO_4$ solution having a pH of about 4.

TABLE 1

| | Corrosion Currents for 316 SS and Exemplary Alloy | | | | | | | |
|---|---|---|---|---|---|---|---|---|
| | Corrosion current without NAFION at pH = 4, 90° C. ($\mu$A) | | | | Corrosion current with NAFION at pH = 4, 90° C. ($\mu$A) | | | |
| | 1.0 V at OCV | 0.5 V at load | 0.6 V at load | 0.7 V at load | 1.0 V at OCV | 0.5 V at load | 0.6 V at load | 0.7 V at load |
| 316 SS | 501 | 100 | 158 | 223 | 160 | 25.1 | 50 | 100 |
| Alloy* | 3.2 | 1.58 | 2.0 | 2.0 | 63 | 12.5 | 12.5 | 17.8 |

*Unannealed alloy data
**Anode potential is close to 0 V vs NHE, Cathode potential (V vs. NHE) is close to the fuel cell operating voltage due to the fact that the anode side is hydrogen fuel As shown in Table 1, 316 SS displays a high corrosion current at pH of about 4 with and without contact with NAFION. In contrast thereto, the exemplary alloy shows a low current density even when contacting NAFION.

The negative scan direction shown in FIG. 3 shows that the exemplary alloy has a larger loop than the 316 SS. Based upon the above analysis, the larger loop indicates that the exemplary alloy has a greater pitting tendency than 316 SS. However, it must be realized that the test samples are in an extreme corrosion environment. Typically, in a real operating fuel cell, the competition reaction of the cathode reduces the corrosion tendency of the bipolar materials. This slightly higher pitting tendency will not affect the cell performance.

Potentiostatic Method

The potentiostatic method can measure the passivation of the metal surfaces. Titanium alloys in polymer electrolyte membrane fuel cells do passivate and become non-conductive under fuel cell operating conditions. The potentiostatic method was used to determine if the 316 SS and exemplary alloy became passivated. The potentiostatic method applies a constant potential to the metal-solution interface and measures its electrochemical behavior as a function of time. A potentiostatic scan begins at a programmed initial potential value, and after a specified initial delay, steps through to a programmed final potential value. The final applied potential is maintained for a specified period of time. The current flow as a result of the applied potentials is thus plotted as a function of time.

Figure 4:
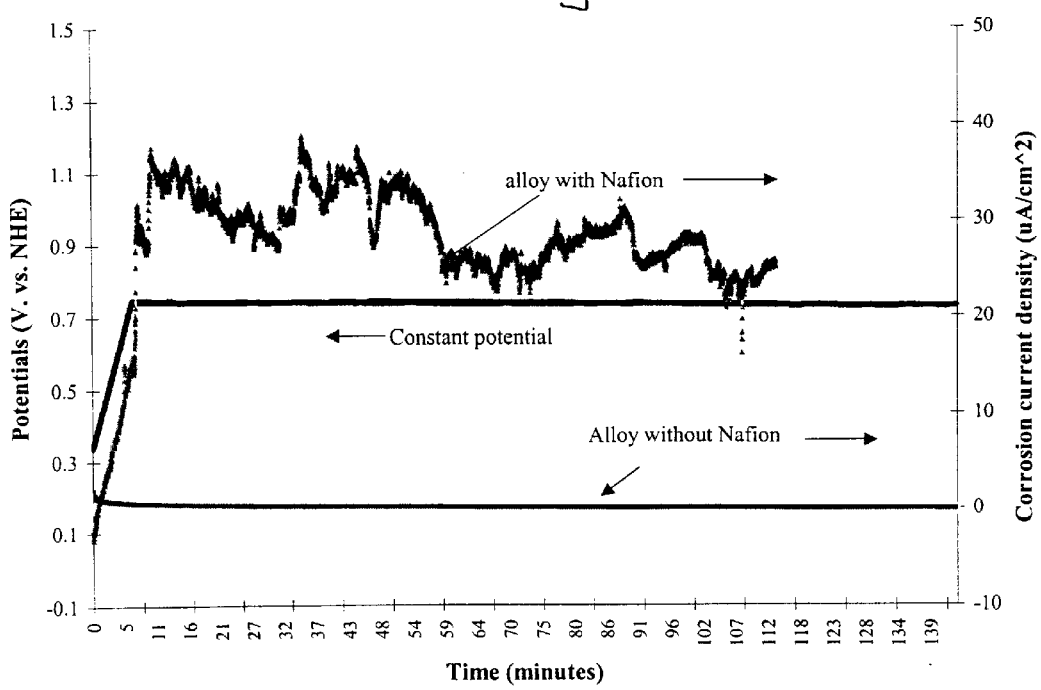
FIG. 4 is a diagram showing the results of a potentiostatic corrosion test for the metal alloy employed in the polymer electrolyte membrane fuel cell stack of this invention with and without NAFION.

FIG. 4 shows the corrosion current as a function of time-at the applied constant potential of about 0.7 V vs. NHE. The corrosion current of the exemplary alloy contacting the NAFION membrane averages to about 30 $\mu$A/cm$^2$, similar to the values shown in FIG. 3. However, the corrosion current is very small, nearly zero, when the exemplary alloy does not contact the NAFION membrane. The surface resistance of the exemplary alloy was constant before and after the test at 136 m$\Omega$. For purposes of comparison, the surface resistance of gold is 80 m$\Omega$. This experiment confirms that there is no passivation of the exemplary alloy under the fuel cell test conditions.

While in the foregoing specification this invention has been described in relation to certain preferred embodiments thereof, and many details have been set forth for the purpose of illustration, it will be apparent to those skilled in the art that the invention is susceptible to additional embodiments and that certain of the details described herein can be varied considerably without departing from the basic principles of this invention.

We claim:

1. A polymer electrolyte membrane fuel cell stack comprising:

a plurality of substantially planar fuel cell units, each said fuel cell unit comprising an anode electrode, a cathode electrode and a polymer electrolyte membrane disposed between said anode electrode and said cathode electrode; and a metal bipolar plate disposed between said anode electrode of one said fuel cell unit and said cathode electrode of an adjacent said fuel cell unit, said metal bipolar plate comprising a chromium-nickel austenitic alloy, wherein said chromium and said nickel, on a combined basis, comprise at least about 50% by weight of said alloy and said nickel comprises greater than about 32% by weight of said alloy.

2. A polymer electrolyte membrane fuel cell stack in accordance with claim 1, wherein said nickel comprises a greater percentage of said alloy than said chromium.

3. A polymer electrolyte membrane fuel cell stack in accordance with claim 1, wherein said nickel comprises in a range of about 32% to about 38% by weight of said alloy.

4. A polymer electrolyte membrane fuel cell stack in accordance with claim 1 further comprising a current collector disposed on a side of each said electrode facing said metal bipolar plate, said current collectors comprising said chromium-nickel alloy.

5. A polymer electrolyte membrane fuel cell stack in accordance with claim 1, wherein at least a portion of said metal bipolar plate is in direct contact with said polymer electrolyte membrane.

6. A polymer electrolyte membrane fuel cell stack in accordance with claim 1, wherein said metal bipolar plate is not coated by a protective coating.

7. A polymer electrolyte membrane fuel cell stack comprising:

a plurality of substantially planar fuel cell units, each said fuel cell unit comprising an anode electrode, a cathode electrode and a polymer electrolyte membrane disposed between said anode electrode and said cathode electrode;

a bipolar plate disposed between said anode electrode of one said fuel cell unit and a cathode electrode of an adjacent said fuel cell unit;

a current collector disposed between each of said electrodes and said bipolar plate; and at least one of said bipolar plates and said current collector comprising a chromium-nickel austenitic alloy, wherein said chromium and said nickel, on a combined basis, comprises at least about 50% by weight of said alloy and said nickel comprises greater than about 32% by weight of said alloy.

8. A polymer electrolyte membrane fuel cell stack in accordance with claim 7, wherein said bipolar plate is a graphite plate.

9. A polymer electrolyte membrane fuel cell stack in accordance with claim 7, wherein said nickel comprises a greater percentage of said alloy than said chromium.

10. A polymer electrolyte membrane fuel cell stack in accordance with claim 8, wherein said graphite plate is molded directly onto at least one of said current collectors.

11. A polymer electrolyte membrane fuel cell stack in accordance with claim 7, wherein said alloy further comprises niobium.

12. A polymer electrolyte membrane fuel cell stack in accordance with claim 7, wherein said alloy further comprises C, Mn, Si, P, S, Mo, Nb and Cu.

13. In a polymer electrolyte membrane fuel cell stack comprising a plurality of fuel cell units, each said fuel cell unit comprising an anode electrode, a cathode electrode and a polymer electrolyte membrane disposed between said anode electrode and said cathode electrode, and a bipolar plate disposed between said anode electrode of one said fuel cell unit and said cathode electrode of an adjacent said fuel cell unit, the improvement comprising:

said bipolar plate comprising a chromium-nickel austenitic alloy, wherein said chromium and said nickel, on a combined basis, comprises at least about 50% by weight of said alloy and said nickel comprises greater than about 32% by weight of said alloy.

14. A polymer electrolyte membrane fuel cell stack in accordance with claim 13, wherein said nickel comprises a greater percentage of said alloy than said chromium.

15. A polymer electrolyte membrane fuel cell stack in accordance with claim 13, wherein said bipolar plate is uncoated.

* * * * *